(12) United States Patent
Wright et al.

(10) Patent No.: US 12,535,425 B2
(45) Date of Patent: Jan. 27, 2026

(54) DISTRIBUTED MULTI-PARAMETER SENSORS FOR SIMULTANEOUS MONITORING OF CORROSION AND HUMIDITY: OPTICAL FIBER SENSORS AND SURFACE ACOUSTIC WAVE SENSORS

(71) Applicant: The United States Department of Energy, Washington, DC (US)

(72) Inventors: Ruishu F. Wright, Venetia, PA (US); Nathan Diemler, Blairsville, PA (US); Nageswara R. Lalam, Dravosburg, PA (US); Jagannath Devkota, Pittsburgh, PA (US); Paul R. Ohodnicki, Jr., Allison Park, PA (US)

(73) Assignee: U.S. Department of Energy, Washington, DC (US)

( * ) Notice: Subject to any disclaimer, the term of this patent is extended or adjusted under 35 U.S.C. 154(b) by 314 days.

(21) Appl. No.: 18/302,209

(22) Filed: Apr. 18, 2023

(65) Prior Publication Data

US 2023/0333024 A1   Oct. 19, 2023

Related U.S. Application Data

(60) Provisional application No. 63/332,101, filed on Apr. 18, 2022.

(51) Int. Cl.
*G01N 21/00*   (2006.01)
*F17D 5/00*    (2006.01)
*G01N 21/77*   (2006.01)

(52) U.S. Cl.
CPC ......... *G01N 21/7703* (2013.01); *F17D 5/005* (2013.01); *G01N 2021/7773* (2013.01); *G01N 2201/084* (2013.01); *G01N 2201/088* (2013.01)

(58) Field of Classification Search
CPC ............... G01N 2021/7723; G01N 2201/088
See application file for complete search history.

(56) References Cited

U.S. PATENT DOCUMENTS

| | | | | |
|---|---|---|---|---|
| 4,692,610 | A * | 9/1987 | Szuchy | G01L 1/247 244/76 R |
| 2004/0218847 | A1* | 11/2004 | Averett | G01D 5/35383 385/12 |
| 2005/0082467 | A1* | 4/2005 | Mossman | G01N 17/04 250/227.16 |
| 2009/0135427 | A1* | 5/2009 | Huang | G01N 21/55 356/445 |
| 2014/0046199 | A1* | 2/2014 | Wang | A61B 5/02055 600/483 |

* cited by examiner

*Primary Examiner* — John E Breene
*Assistant Examiner* — Alex T Devito
(74) *Attorney, Agent, or Firm* — Timothy L. Harney; Aaron R. Keith; Michael Dobbs

(57) ABSTRACT

One or more embodiments relate to a sensor configuration system comprising at least one device configured to sense a first parameter; at least one device configured to sense a second parameter, and at least one interrogator device. The at least one device configured to sense the second parameter interfaces with the at least one device configured to sense the first parameter, and the at least one interrogator device interfaces both the at least one device configured to sense the first parameter and the at least one device configured to sense the second parameter where the at least one interrogator device spatially interrogates both the at least one device configured to sense the first parameter and the at least one device configured to sense the second parameter.

13 Claims, 21 Drawing Sheets

FIGURE 7A
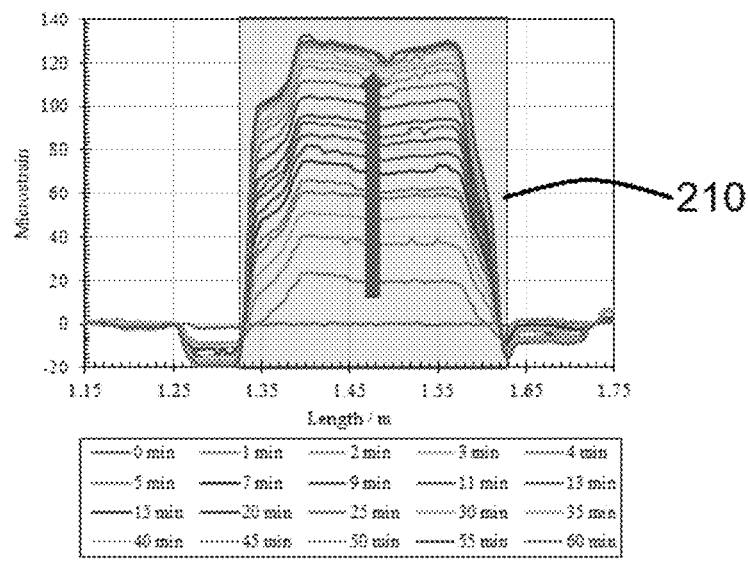
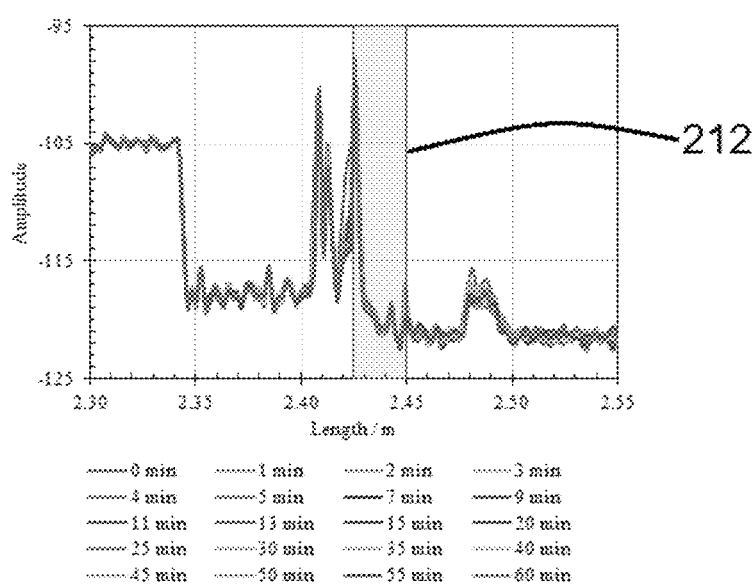
FIGURE 7B

FIGURE 9A
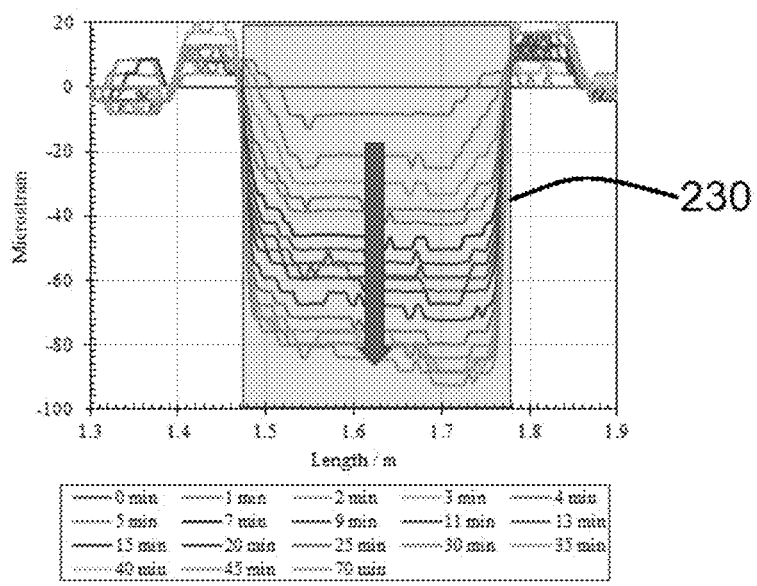
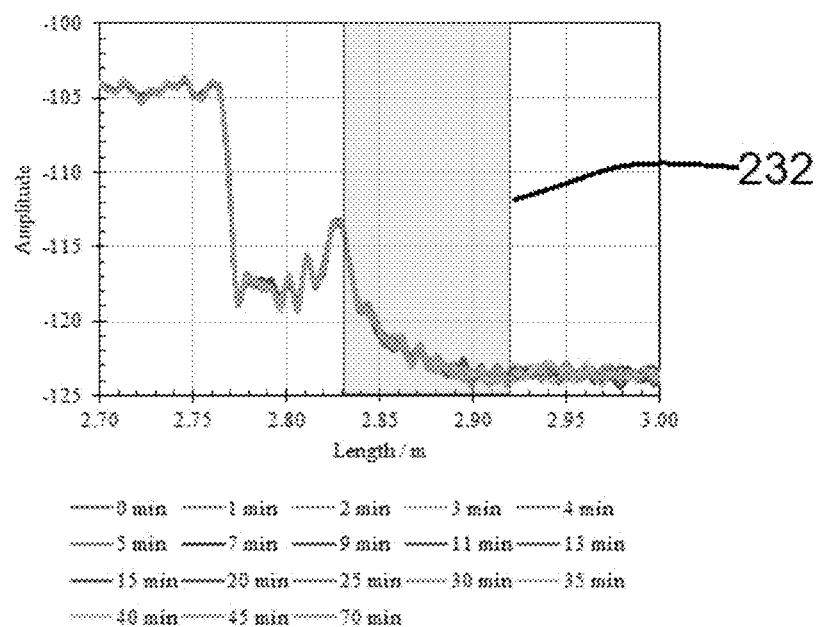
FIGURE 9B

FIGURE 10A
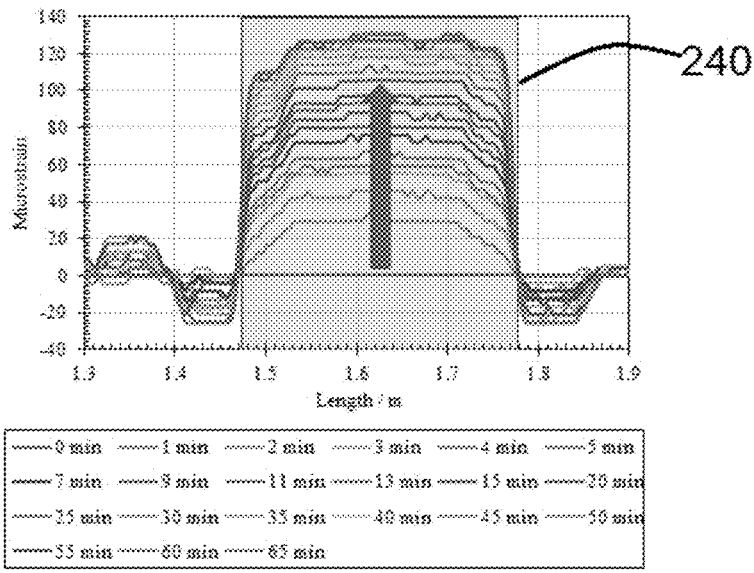
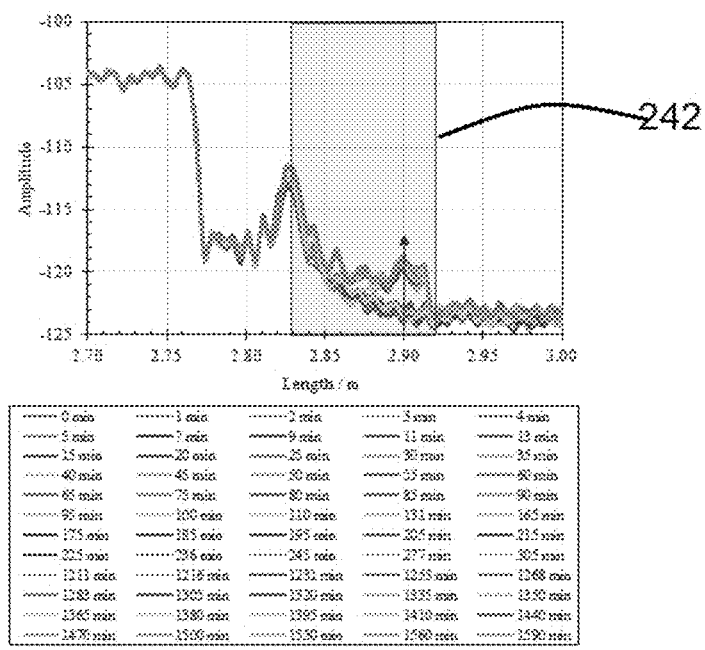
FIGURE 10B

FIGURE 11A  FIGURE 11B
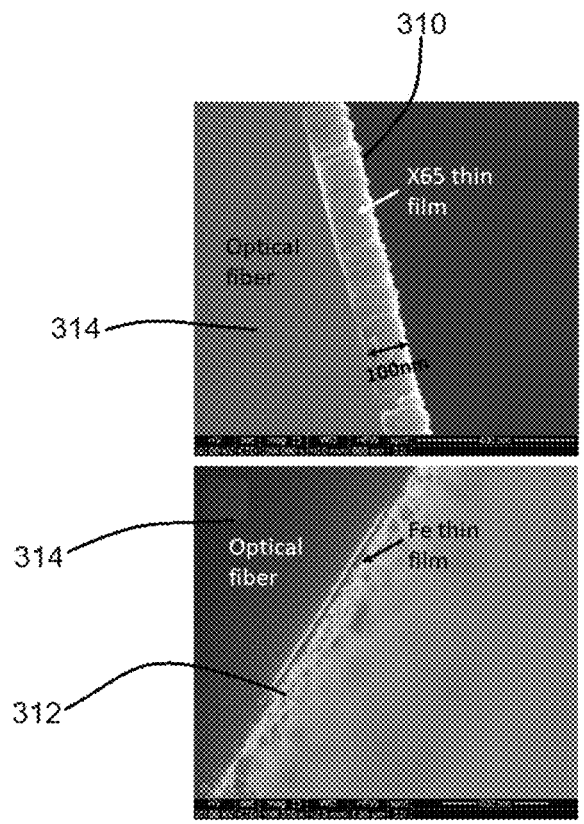
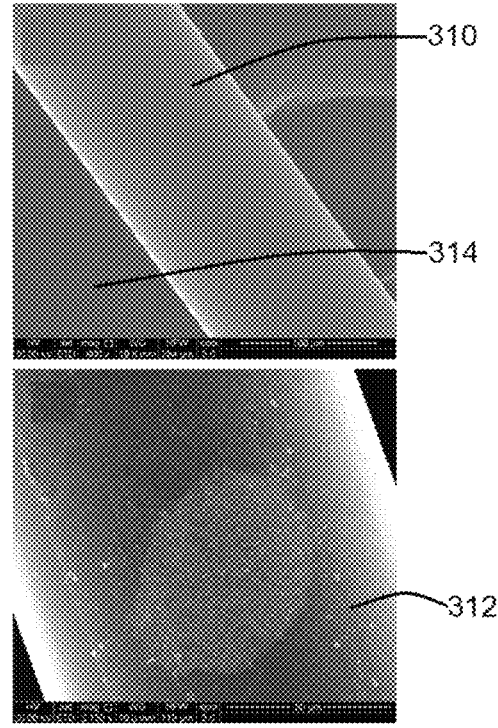
FIGURE 11C  FIGURE 11D

FIGURE 18A
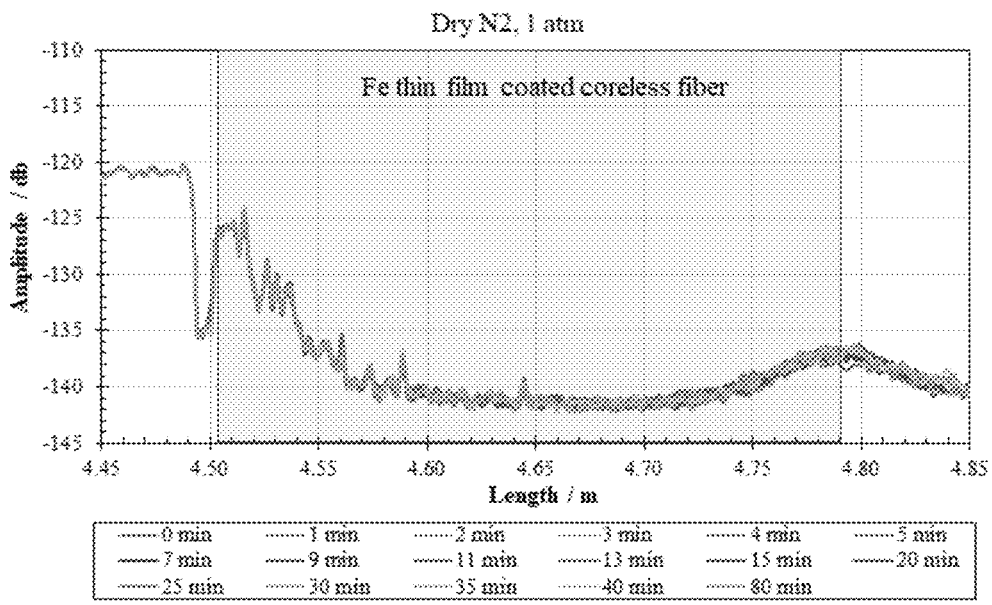
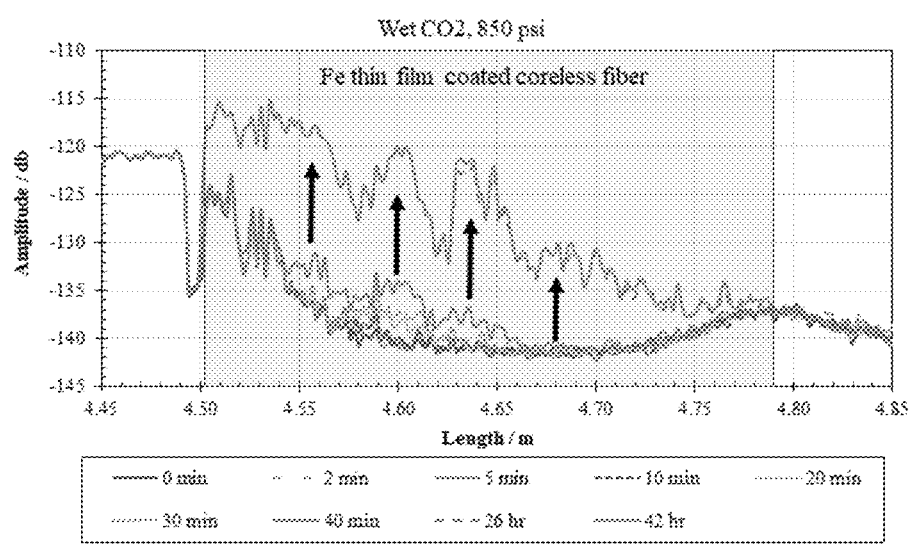
FIGURE 18B

FIGURE 22A
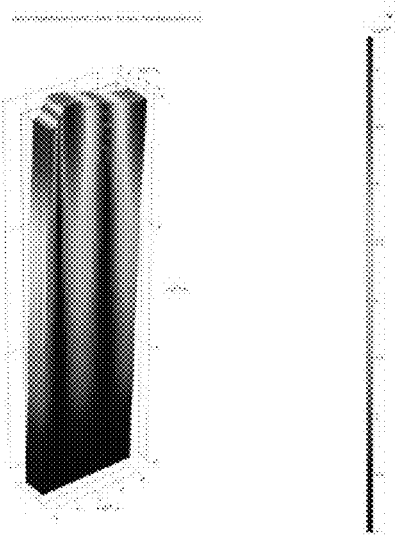
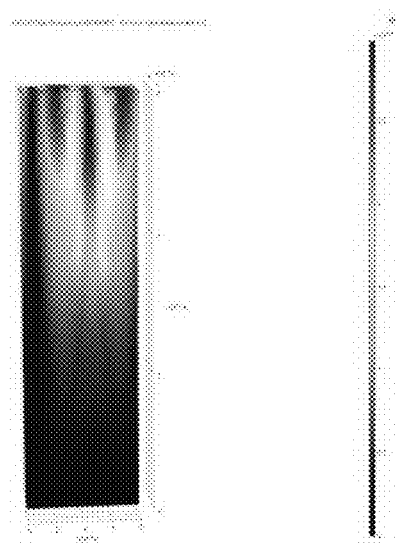
FIGURE 22B

DISTRIBUTED MULTI-PARAMETER SENSORS FOR SIMULTANEOUS MONITORING OF CORROSION AND HUMIDITY: OPTICAL FIBER SENSORS AND SURFACE ACOUSTIC WAVE SENSORS

CROSS-REFERENCE TO RELATED APPLICATION

This application claims the benefit of and priority to 63/332,101 filed Apr. 18, 2022, the complete subject matter of which is incorporated herein by reference.

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

Embodiments relate to detecting corrosion and humidity simultaneously. More specifically embodiments relate to a system and method for detecting corrosion and humidity simultaneously.

BACKGROUND

Corrosion is a critical issue in the oil and natural gas industry as it adversely affects the component functionality and structural integrity of the infrastructure for exploration, production, transportation, processing, and $CO_2$ sequestration. The natural gas delivery system comprises 528,000 km (328,000 miles) of transmission and gathering pipelines. According to the Pipeline and Hazardous Materials Safety Administration (PHMSA), corrosion is responsible for ~25% of the natural gas transmission and gathering pipeline incidents over the last 30 years. 61% of the corrosion-caused incidents are due to internal corrosion. The ability to detect early corrosion onset in real-time before the structural integrity is compromised may have a significant impact on preventing catastrophic failures of infrastructure resulting from corrosion.

Water vapor condensation provides aqueous electrolytes for corrosion to occur inside the pipe. Inherently existing acid gases such as $CO_2$ and $H_2S$ can dissolve in water forming corrosive electrolytes. Top-of-the-Line Corrosion (TLC) is a phenomenon encountered in natural gas transmission pipelines when internal corrosion occurs due to the condensation of water vapor and dissolved corrosive substances. Despite an upstream gas dehydration treatment, liquid water can form through the condensation of water vapor and the water carried over from plant upsets. In addition, glycol used in gas dehydration units is miscible with water and can be introduced into the pipelines as water/glycol mixture through mist carryover or inadvertent upsets.

Because corrosion inhibitors cannot be effectively applied to the top of the line, water droplets on the top of the line are unbuffered with low pH from dissolved acid gas such as inherently existing $CO_2$ and $H_2S$. As corrosion occurs, the water droplets are saturated and supersaturated with corrosion products, and the pH is increased.

In offshore pipe-in-pipe systems, "cold spots" occur when the gap between the inner and outer pipes is not filled with insulation. Cold spots are prone to corrosion due to condensed water. Because water is a key parameter that initiates and sustains corrosion, water detection may serve as an early indicator for potential internal corrosion inside the pipeline. The corrosion rate (CR) of TLC has been found to be proportional to the water condensation rate ($R_{wc}$), and thus the measurement of $R_{wc}$ can quantify the corrosion rate. For example, CR=0.004 $R_{wc}$ $C_{Fe}$ (12.5-0.09 T), where CR is TLC corrosion rate in mm/year, $R_{wc}$ is the water condensation rate in g/m2s, $C_{Fe}$ is the solubility of iron in ppm, and T is the temperature in ° C. This means that monitoring humidity or water condensation may not only indicate corrosive conditions but also quantify corrosion rate. Therefore, a multi-parameter sensor that simultaneously monitors corrosion and humidity may efficiently predict and detect corrosion and quantify a corrosion rate, enabling timely pipeline maintenance and repair before catastrophic failures occur.

Current commercially available corrosion sensors are not adequate for real-time and spatially distributed monitoring, as they are either point or standoff sensors or only run every few years, as shown in Table 1. Therefore, there is a technology gap in real-time distributed sensor technologies for long-distance pipeline corrosion monitoring.

TABLE 1

| Sensor | Temporal | Spatial | Advantages | Disadvantages |
| --- | --- | --- | --- | --- |
| Corrosion coupon | A few months | Point sensor | Gold standard, Simple, Easy to operate | General corrosion, Not real-time |
| Electrical resistance probe | Real-time | Point sensor | Real-time, Remote sensing compatible | Uniform corrosion, Electrical based |
| Electrochemical sensor | Real-time | Point sensor | Various in-situ electrochemical techniques | Electrical based, Mostly for conductive liquids |
| Ultrasonic sensor | Real-time | Point sensor, integration with ILI | Non-intrusive | Not sensitive to small thin features |
| Magnetic flux leakage sensor | Real-time | Point sensor, integration with ILI | Nondestructive | Limited for surface detection |
| Electromagnetic sensor | Real-time | Point sensor, integration with ILI | Nondestructive, Inner wall features | Not sensitive to small defects |
| Pipeline inspection gauge | Every 5-7 years | Run through pipes | Comprehensive sensing/ logging, Long distance | Costly, not frequent |
| Optical fiber | Real-time | Distributed | Distributed sensing for | Cost of |

TABLE 1-continued

| Sensor | Temporal | Spatial | Advantages | Disadvantages |
| --- | --- | --- | --- | --- |
| sensors | | linear sensors | a long distance, Multi-parameter | interrogation instrument |
| Passive wireless sensors | Real-time | Ubiquitous point sensors | Small size, Passive, Wireless capability, Low cost | Wireless telemetry in attenuating media |

A need, therefore, exists in the art for an improved corrosion and humidity detection device.

SUMMARY

One object of at least one embodiment is related to a system and method for detecting corrosion and humidity simultaneously.

One embodiment relates to a sensor configuration system including at least one device configured to sense a first parameter; at least one device configured to sense a second parameter and at least one interrogator device. The at least one device configured to sense the second parameter interfacing with the at least one device configured to sense the first parameter; and the at least one interrogator device optically or electrically communicating with both the at least one device configured to sense the first parameter and the at least one device configured to sense the second parameter where the at least one interrogator device spatially interrogates both the at least one device configured to sense the first parameter and the at least one device configured to sense a second parameter.

Another embodiment relates to a sensor configuration system comprising a plurality of devices sensing a first parameter; a plurality of devices sensing a second parameter; and at least one interrogator device. The plurality of devices sensing the second parameter optically communicates with the plurality of devices sensing the first parameter using a single optical fiber; and the at least one interrogator device optically communicates with both the plurality of devices sensing the first parameter and the plurality of devices sensing the second parameter via the optical fiber and spatially resolves measurements along the optical fiber providing location information.

Still another embodiment relates to sensor configuration system comprising a plurality of humidity/water sensing elements; a plurality of corrosion sensing elements communicating with the plurality of humidity/water sensing elements and a distributed optical fiber interrogator. The plurality of corrosion sensing elements communicate with the plurality of humidity/water sensing elements using a single optical fiber, wherein the plurality of humidity/water sensing elements and the plurality of corrosion sensing elements are arranged in an alternating pattern along the single optical fiber. The distributed optical fiber interrogator communicates with both the plurality of humidity/water sensing elements and the plurality of corrosion sensing elements via the single optical fiber, with amplification to enhance interrogation distance, which measures backscattered light power intensity changes and strain changes simultaneously and provides location information along the optical fiber Embodiments include the at least one device sensing the first parameter comprises a corrosion sensing element. The corrosion sensing element may include an optical fiber coated with a corrosion proxy sensing material such as a metal film that leads to light power intensity changes when corroded, where the metal film is selected from a group comprising Fe, Ni, X65 carbon steel, carbon steel, stainless steels, alloys, or other metallic films. The optical fiber may include a cladding over at least a portion thereof. Alternatively, the at least one device sensing the first parameter may comprise one or more multi-element surface acoustic wave (SAW) sensor array having wired and/or wireless capability.

Further embodiments may include the at least one device sensing the second parameter may include a humidity/water sensing element, where the humidity/water sensing element is a single-mode optical fiber having a polymer or hydrogel jacket leading to strain changes at different humidity levels. The polymer or hydrogel jacket is selected from a material group that expands or shrinks when exposed to different humidity or water content comprising acrylate, polyimide, and porous hydrogels. Alternatively, the at least one device sensing the second parameter comprises one or more multi-element surface acoustic wave (SAW) sensor arrays having wired and/or wireless capability. At least a portion of the single-mode optical fiber includes cladding.

Embodiments are contemplated in which the at least one device sensing the first parameter; the at least one device sensing the second parameter and the at least one interrogator device are optically coupled using a single optical fiber providing at least location information.

Further embodiments contemplate the at least one interrogator device comprises a distributed optical fiber interrogator with amplification to enhance interrogation distance, which measures backscattered light power intensity changes and strain changes simultaneously and provides location information along the optical fiber.

BRIEF DESCRIPTION OF THE DRAWINGS

The invention together with the above and other objects and advantages will be best understood from the following detailed description of the preferred embodiment of the invention shown in the accompanying drawings, wherein:

FIGS. 7A-7B graphically depict simultaneous measurements of the strain (FIG. 7A) and the light intensity amplitude (FIG. 7B) during humidity change;

FIGS. 9A and 9B graphically depict simultaneous measurements of the strain (FIG. 9A) and the light intensity amplitude (FIG. 9B) when the humidity was changed from the atmospheric RH to 0% RH $N_2$ of FIG. 6;

FIGS. 10A-10B graphically depict simultaneous measurements of the strain (FIG. 10A) and the light intensity amplitude (FIG. 10B) when a condition was changed from dry 0% RH $N_2$ to wet 100% RH $CO_2$ gas in the glass tube of FIG. 6;

FIGS. 11A-11D depict SEM images of X65 carbon steel and Fe thin films coated on a coreless optical fiber where FIG. 11A depicts a cross-section of 100 nm thick X65 film on the optical fiber; FIG. 11B depicts a uniform and smooth X65 thin film on the optical fiber before corrosion; FIG. 11C depicts a cross-section of ~35 nm thick Fe thin film on the optical fiber; and FIG. 11D depicts a localized corrosion on the Fe thin film after corrosion in wet $CO_2$ gas;

FIGS. 18A-18B depict backscattered light intensity amplitude along the Fe thin film-coated coreless fiber section during dry $N_2$ flow at 1 atm (FIG. 18A) and wet CO2 gas at 850 psi (FIG. 18B).

FIGS. 22A-22B depicts surface displacements of a SAW sensing device (a 41° Y-X LiNbO3 periodic structure at resonance), where FIG. 22A depicts a bare structure and FIG. 22B depicts a 100 nm thick SiO2 guiding layer;

DETAILED DESCRIPTION

The foregoing summary, as well as the following detailed description of certain embodiments of the present invention, will be better understood when read in conjunction with the appended drawings.

At least one embodiment of the present invention relates to distributed multi-parameter sensors for simultaneous monitoring of corrosion and humidity using either optical fiber sensors or wireless SAW sensors. In embodiments using optical fiber-based sensors, light power intensity changes are leveraged for monitoring corrosion and frequency spectra shift for humidity monitoring. In embodiments using SAW sensors, a multi-element SAW sensor array is used for simultaneous monitoring corrosion and humidity. In most cases, functional sensing material layers are coated on the sensor platforms to enable corrosion or humidity monitoring.

Figure 1:
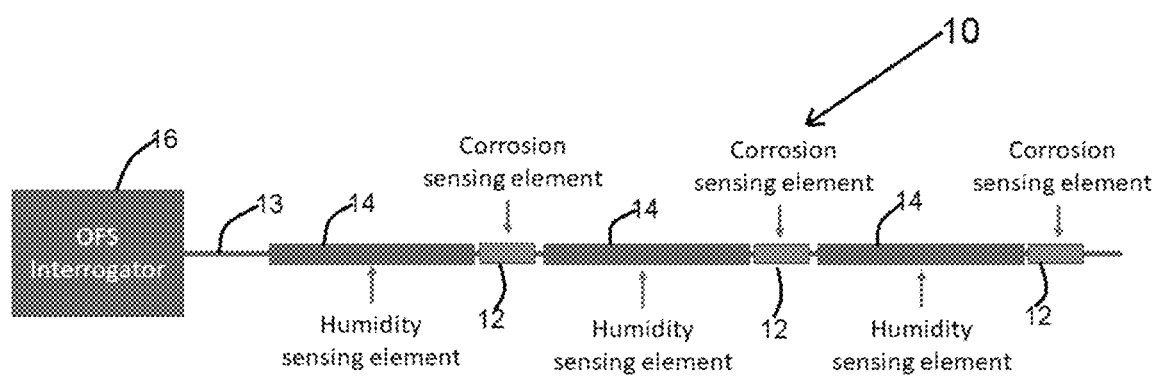
FIG. 1 depicts a simplified schematic representation of a distributed multi-parameter optical fiber sensor (OFS)

FIG. 1 depicts a simplified schematic representation of a distributed multi-parameter optical fiber sensor (OFS), designated 10, for simultaneously monitoring corrosion and humidity. The multi-parameter optical fiber sensor 10 is constructed with at least one corrosion sensing element 12 and a humidity/water sensing element 14 interfacing, conveying, transmitting, or communicating (optically and/or electrically) therewith via an optical cable 13 for example. It should be appreciated that while one corrosion sensing element 12 and humidity/water sensing element 14 are discussed, a plurality of corrosion sensing elements 12 and humidity/water sensing elements 14, arranged in an alternating pattern for example, are contemplated. FIG. 1 further depicts a distributed optical fiber interrogator 16 electrically coupled to and spatially interrogating at least one of or all the corrosion sensing element 12 and a humidity/water sensing element 14.

Figures 2A, 2B:
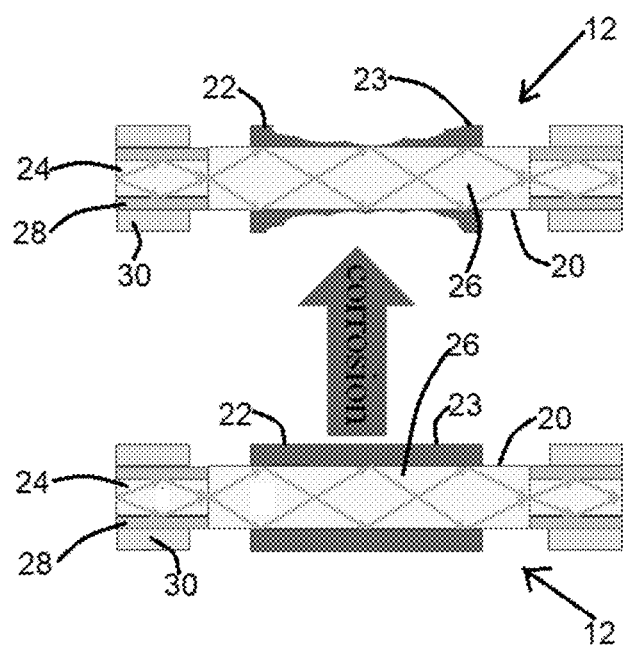
FIGS. 2A-2B depict a simplified schematic representation of the corrosion sensing element of FIG. 1 and further illustrate the corrosion sensing principle.

FIGS. 2A-2B depict a simplified schematic representation of the corrosion sensing element 12 of FIG. 1, and further illustrate the corrosion sensing principle where corrosion proxy sensing materials lead to light power intensity changes when corroded.

In the illustrated embodiment, the corrosion sensing element 12 comprises a section of optical fiber 20 coated with a corrosion proxy material 22 (usually a metallic film 23 such as Fe, Ni, X65 carbon steel, carbon steel, stainless steels, alloys, other metallic films, and combinations thereof) that corrodes at a rate which provides insight into the corrosion inside a pipeline for example. In the illustrated embodiment, optical fiber 20 comprises multi-mode fiber core 24 and coreless optical fiber 26. The multi-mode fiber core 24 includes and is coated with cladding 28 and polymer jacket 30.

Light travels along the optical fiber 20 in the direction indicated by the arrows. The metallic thin film 23 leads to broadband light absorption in the evanescent field, which occurs at the interface between the optical fiber 20 and the thin film 23 along the fiber. As the metallic film 23 thins (See FIG. 2B), light absorption of the film decreases; therefore, the light transmission intensity and backscattering intensity increase throughout the optical fiber 20. The corrosion sensing element 12 measures the light power intensity, and in the distributed interrogation system, measures the amplitude of backscattered light.

The metallic film 23 may be coated onto the optical fiber 20 using known coating processes including electroless plating or sputter deposition. Before deposition, the polymer jacket 30 is stripped off the coreless section 26, which is then cleaned (using isopropyl alcohol for example). Then, it was spliced with multiple-mode optical fibers 24 at the two ends.

In one exemplary embodiment, a metallic film 23, X65 carbon steel thin film for example, is coated on the optical fibers 20. In this example, 100-nm of X65 thin film was deposited with a plasma sputter deposition system using a direct current (DC) power source. A 3-inch sputtering target made of grade X65 which meets American Petroleum Institute (API) 5 L specification for pipeline steel. The optical fiber 20 is held by a custom-made fixture connected to a rotator inside the sputtering chamber to achieve a uniform thickness around the fiber. The sputtering is run at room temperature, 50 W DC, and 3 mTorr chamber pressure with a 12-cm sputter distance using Ar as the process gas. The target is pre-sputtered for 20 min to remove undesired contamination on the surface prior to deposition.

In another exemplary embodiment, the metallic thin film 23 may comprise an electroless plated Fe film as the corrosion sensing coating. The coreless fiber section 26 is sensitized in a solution consisting of 22.6 g/L tin(II) chloride ($SnCl_2$, 98%) and 10.0 mL/L hydrochloric acid (HCl, concentrated) for 30 seconds. The coreless optical fiber section 26 is then activated by immersion into a solution consisting of 0.795 g/L of palladium(II) chloride ($PdCl_2$, 99%) and 5.00 mL/L HCl for 30 seconds. Repeated sensitization and activation is found to improve plating, and the fiber section is rinsed in deionized (DI) water and dried under nitrogen. The coreless section of fiber is then submerged in a plating bath consisting of 11 g/L $FeSO_4.7H_2O$, 57 g/L $C_6H_5Na_3O_7.2H_2O$, 3.0 g/L $NaBH_4$, and 10 g/L $H_3BO_3$. The pH of this solution was adjusted to 9.8 with 1.2 M NaOH. After 1-2 minutes, the fiber was removed and was ready to be used for corrosion tests.

Figures 3A, 3B:
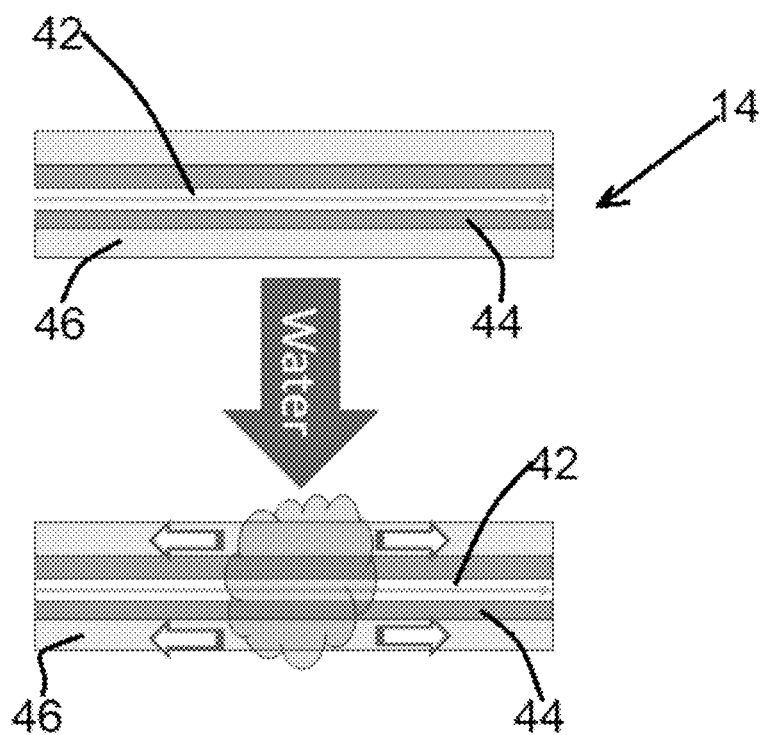
FIGS. 3A-3B depict a simplified schematic representation of the humidity/water sensing element of FIG. 1 and further illustrate the humidity/water sensing principle.

FIGS. 3A-3B depict a simplified schematic representation of the humidity/water sensing element 14 of FIG. 1 and the humidity/water sensing principle. In at least one embodiment, the hygroscopic polymer jacket of the SM fiber expands or swells from water absorption, and the water-induced strain may be interrogated by an optical fiber interrogator, which in this embodiment is an Optical Frequency Domain Reflectometry (OFDR).

In the illustrated embodiment, the humidity/water sensing element 14 is a polymer jacketed single-mode optical fiber 42. The polymer jacket 46 expands or swells when exposed to humidity and/or water, and therefore results in strain on the optical fiber 42. The strain changes on the optical fiber 42 are measured via Rayleigh backscattering spectra shifts using the Optical Frequency Domain Reflectometry (OFDR). The humidity/water sensing principle is illustrated in FIGS. 3A-3B. It should be appreciated that the intrinsic polymer jacket of commercial single-mode fiber is hygroscopic enough to be the water-sensing layer. This strain-based water sensor is sensitive to $H_2O$ molecules regardless of the phase of water (liquid or vapor) or the surrounding media (air or oil).

Figures 4A, 4B:
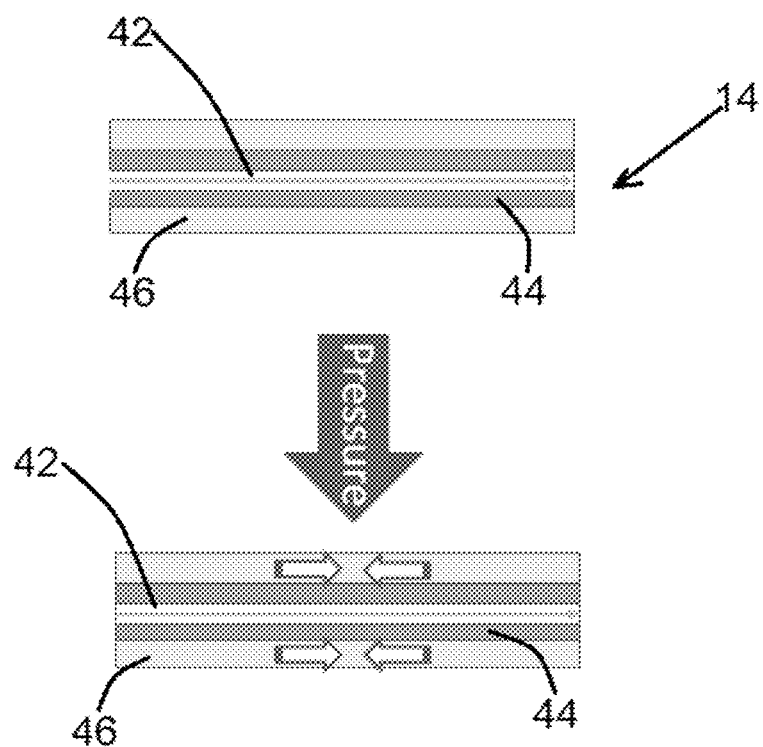
FIGS. 4A-4B depict the humidity/water sensing element of FIG. 3 subject to pressure-induced strain and further illustrate the pressure-induced strain sensing principle.

FIGS. 4A-4B depict the humidity/water sensing element 14 of FIGS. 1 and 3A-3B subject to pressure-induced strain.

When the single-mode optical fiber sensor is placed in high pressure environments, the pressure results in compressive strains on the fiber. To compensate for the pressure effect inside the natural gas pipelines, a single-mode optical fiber (SMF) section without polymer jacket can be used as a pressure reference because, without the polymer jacket, the SMF section is not sensitive to water but can still monitor pressure.

Figure 5:
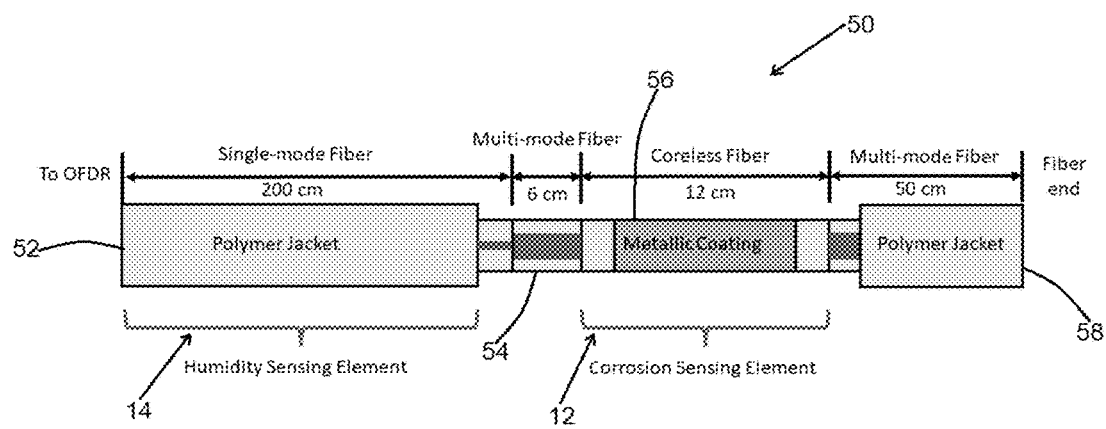
FIG. 5 depicts a simplified exemplary schematic design of one sensing unit of the multiparameter OFS.

FIG. 5 depicts a simplified schematic design of one sensing unit of the multiparameter OFS 50 containing one corrosion sensing element 12 and one humidity sensing element 14. In one embodiment, the multiparameter OFS 50 is constructed by splicing the corrosion sensing element 12 and humidity sensing element 14 in a repeated manner so that light can propagate continuously along a single optical fiber, as shown in FIG. 1. FIG. 5 depicts one sensing unit 50 which contains one corrosion sensing element 12 and one humidity sensing element 14, which was fabricated with 2 meters of the polymer jacketed single-mode (SM) fiber 52, a 6-cm section of multi-mode fiber 54, a 12-cm section of metallic film coated coreless fiber 56, and a 50-cm section of multimode fiber 58 spliced together, as shown in FIG. 5.

Figure 6:
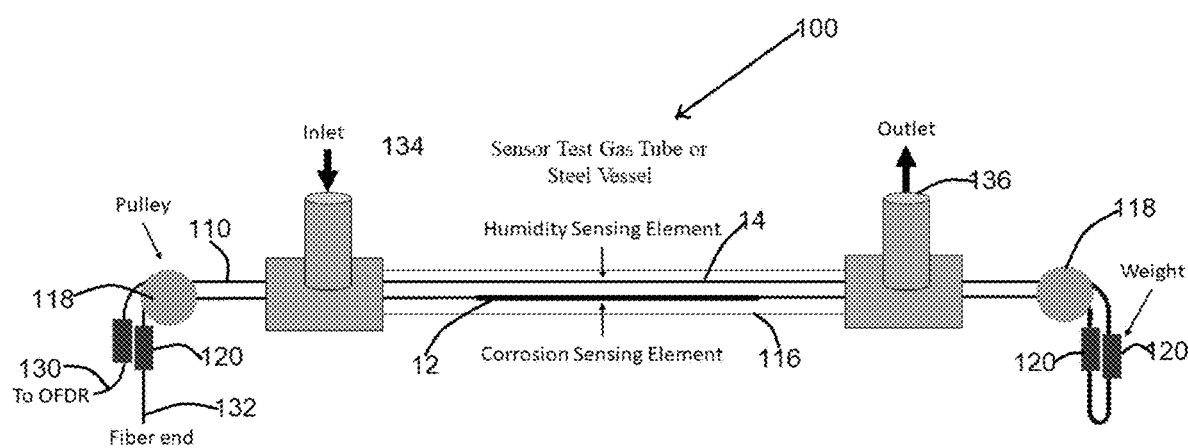
FIG. 6 depicts a simplified schematic diagram of an exemplary setup and fiber sensor configuration.

FIG. 6 depicts a simplified schematic diagram of an experimental setup and fiber sensor configuration 100. The OFS 110 is looped back in the test tube or vessel 116 so that the humidity and corrosion-sensing elements 14 and 12 are exposed to the same environment. As illustrated, the spliced optical fiber 110 is placed in a glass tube 116 (diameter of 1.5 cm, ~30 cm long). The fiber 110 is looped back through the glass tube setup 116 so that a section of the jacketed SM fiber 110 (humidity/water sensor 14) and the metallic film-coated coreless fiber section (corrosion sensor 12) are positioned inside the glass tube. The fiber 110 directly outside each end of the tube 116 is wrapped around a pulley 118 (about 40 cm from one pulley 118 to the other). Weights 120 (9.77 g each) are clipped on each end of the two fiber sections to keep the fiber straight and ensure a controlled tension is placed on each fiber section in the glass tube. End 130 of the SM fiber is connected to the OFDR (not shown). The OFDR provides a spatial profile of the backscattered light intensity and strains along the fiber, enabling distributed monitoring of corrosion and water/humidity. End 132 is not connected to anything.

The multi-parameter sensor 100 is evaluated in both aqueous (HCl solution, pH 3) and humid gas ($N_2$, $CO_2$) conditions to monitor corrosion and water humidity with location information. For the strain measurements, the fiber is first stabilized with weights, and the strain profile along the fiber 110 with weights 120 and set as the new reference. Then, dry nitrogen is flowed through the glass tube 116 via input 134 and output 136 at a rate of 100 sccm until the fiber polymer jacket is observed to be completely dry. Next, the same nitrogen flow is bubbled through water causing the humidity in the glass tube to increase to 100% relative humidity (RH). Alternatively, nitrogen is exchanged for $CO_2$ through the bubbler to simulate wet $CO_2$ corrosion. The HCl solution was also used to simulate conditions leading to mass loss caused by corrosion. A new strain reference is reset for each change in condition.

In one embodiment, each OFDR measurement provides a spatial profile of both light intensity and strain simultaneously along the fiber with location information. Therefore, the two sections of optical fiber can detect corrosion and water simultaneously inside the glass tube.

FIGS. 7A-7B graphically depict simultaneous measurements of the strain (FIG. 7A) and the light intensity amplitude (FIG. 7B) when the humidity is changed from 0% RH to 100% RH $N_2$. The blue block 210 in FIG. 7A highlights the SM optical fiber length within the glass tube (~30 cm) as the humidity sensor, and the strain increased by ~125 pc due to water-induced swelling of the polymer jacket of the SM fiber. In one embodiment, it takes ~50 min for water absorption in the polymer jacket to be stabilized. The gray block 212 in FIG. 7B highlights the 2.5 cm length of X65 film coated section as the corrosion sensor, which illustrates negligible changes due to minimal corrosion in wet $N_2$ gas within 60 min.

Figure 8A:
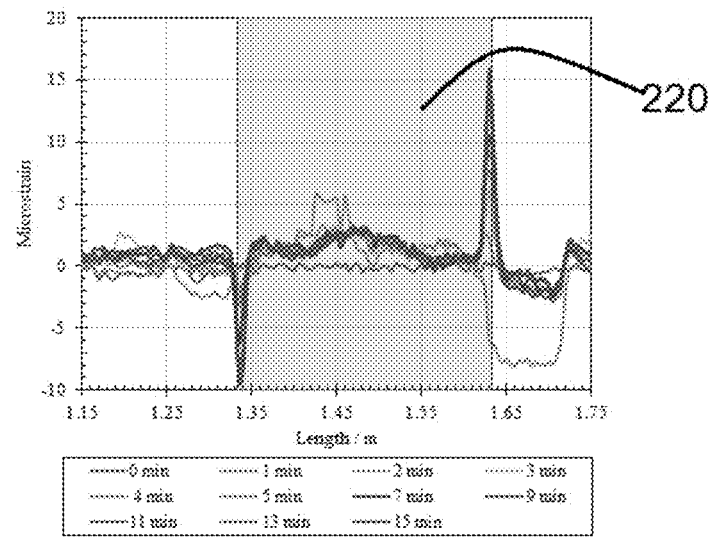
FIGS. 8A-8B graphically depict simultaneous measurements of the strain (FIG. 8A) and the light intensity amplitude (FIG. 8B) when conditions are changed from 100% RH $CO_2$ to an HCl solution of pH 3 in the glass tube of FIG. 6.
Figure 8B:
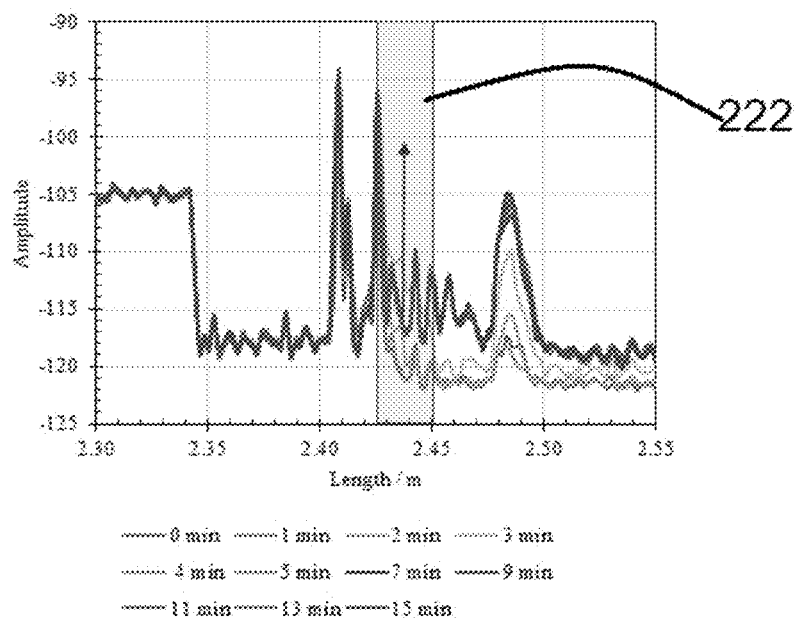

FIGS. 8A-8B graphically depict simultaneous measurements of the strain (FIG. 8A) and the light intensity amplitude (FIG. 8B) when conditions are changed from 100% RH $CO_2$ to an HCl solution of pH 3 in the glass tube to simulate mass loss during corrosion. The blue block 220 in FIG. 8A highlights the SM optical fiber length within the glass tube and the gray block 222 in FIG. 8B highlights the 2.5 cm length of X65 film-coated section.

When the HCl solution (pH 3) is poured into the glass tube 116, the X65 thin film dissolves in the solution which simulates mass loss during corrosion. As shown in FIG. 8B, the backscattered light intensity increased in the X65 thin film-coated location. This is due to the decrease in light absorption of the X65 thin film as the film thins. Meanwhile, the strain profile did not change significantly along the fiber (FIG. 8A) due to minimal changes in water absorption in the polymer jacket going from 100% RH to the aqueous phase.

In one embodiment, a Fe thin film (9 cm long, ~35 nm thick) is used as a corrosion proxy. FIGS. 9A and 9B graphically depict simultaneous measurements of the strain (FIG. 9A) and the light intensity amplitude (FIG. 9B) when the humidity is adjusted from atmospheric RH to 0% RH $N_2$. The strain decreased by ~85µε due to water desorption from the polymer jacket of the SM fiber during drying. The gray block 232 in FIG. 9B highlights the Fe thin film coating as a corrosion sensor, which showed negligible changes. The blue block 230 in FIG. 9A highlights the SM optical fiber length within the glass tube. Combined with FIG. 7B, it is found that the corrosion proxy sensor does not have cross-sensitivity to humidity during the humidity variation.

FIGS. 10A-10B graphically depict simultaneous measurements of the strain (FIG. 10A) and the light intensity amplitude (FIG. 10B) when the condition are changed from dry 0% RH $N_2$ to wet 100% RH $CO_2$ gas in the glass tube. It should be appreciated that, because wet $CO_2$ gas can cause corrosion, this step leads to changes in both humidity and corrosion. As illustrated in FIGS. 10A-10B, the multi-parameter sensor successfully detected both phenomena simultaneously. The strain along the SM fiber inside the tube increased by ~125µε (FIG. 10A), demonstrating humidity sensing, which was in good agreement with FIG. 7A. The blue block 240 in FIG. 10A highlights the SM optical fiber length within the glass tube. The gray block 242 in FIG. 10B highlights the 9 cm long Fe thin film coated section for corrosion monitoring, where localized corrosion was observed as only a few locations of the Fe coating showed an increase in the backscattered light intensity.

Localized corrosion is caused by dissolved $CO_2$ in the condensed water droplets attached onto the optical fiber sensor. This type of localized corrosion is representative of internal corrosion in the natural gas pipelines; therefore, the multi-parameter sensor is a promising sensor to identify and locate the internal corrosion inside the pipeline. Note that corrosion in wet $CO_2$ gas was relatively slow, taking >1 days to see the light intensity increases for the 35 nm thick Fe film, compared to the metallic film dissolution in the HCl solution. The top oxidation layer of the metallic thin film may be protective of the underlying metal from wet $CO_2$ gas corrosion, which may be another factor for the observed slow corrosion.

FIGS. 11A-11D depict SEM images of the X65 carbon steel and Fe thin films 310 and 312 respectively coated on the coreless optical fibers 314 where FIG. 11A depicts a cross-section of 100 nm thick X65 film 310 on the optical fiber; FIG. 11B depicts a uniform and smooth X65 thin film on the optical fiber 314 before corrosion; FIG. 11C depicts a cross-section of ~35 nm thick Fe thin film 312 on the optical fiber 314; and FIG. 11D depicts a localized corrosion on the Fe thin film 312 after corrosion in wet $CO_2$ gas.

Figure 12:
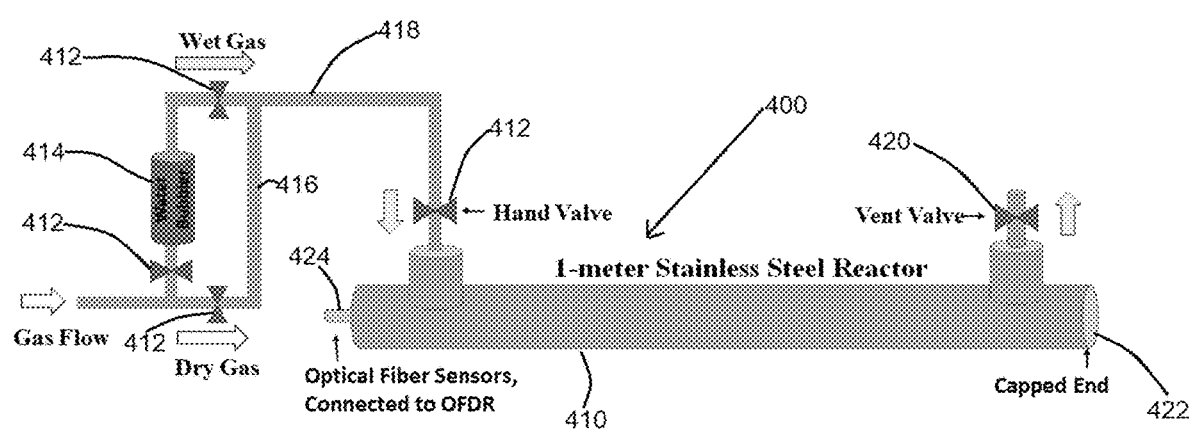
FIG. 12 depicts a schematic diagram of an experimental setup for distributed optical fiber measurements under high pressure.

FIG. 12 depicts a schematic diagram of an experimental setup designated 400 for distributed optical fiber measurements in a stainless-steel tube reactor under high pressure. FIG. 12 depicts setup 400 includes a high-pressure stainless-steel (SS) tube reactor 410 constructed for sensor testing under high pressures. The main reactor chamber consists of a 1-meter SS tube 410 with 1 inch (2.54 cm) outer diameter and 0.083 inch (0.21 cm) wall thickness. Gas flow of $N_2$ or $CO_2$ was controlled using a plurality of mass flow controllers or valves 412. Humidity is controlled using the water bubbler 414. All the tests are run at room temperature (~22° C.). The pressures are maintained at 900 psi for $N_2$ and 850 psi for $CO_2$. Once the desired pressure is achieved, the humidity inside the reactor is controlled by changing the flow path from the dry gas line 416 to the water bubbler line 418. To change the gas or humidity conditions inside the reactor, the vent valve 420 at the capped end 422 is slightly opened to change gas and humidity throughout the reactor chamber while maintaining the pressure. At least 5 minutes of gas flow was used for switching gases and >40 minutes for changing the humidity inside the reactor 410.

Figure 13A:
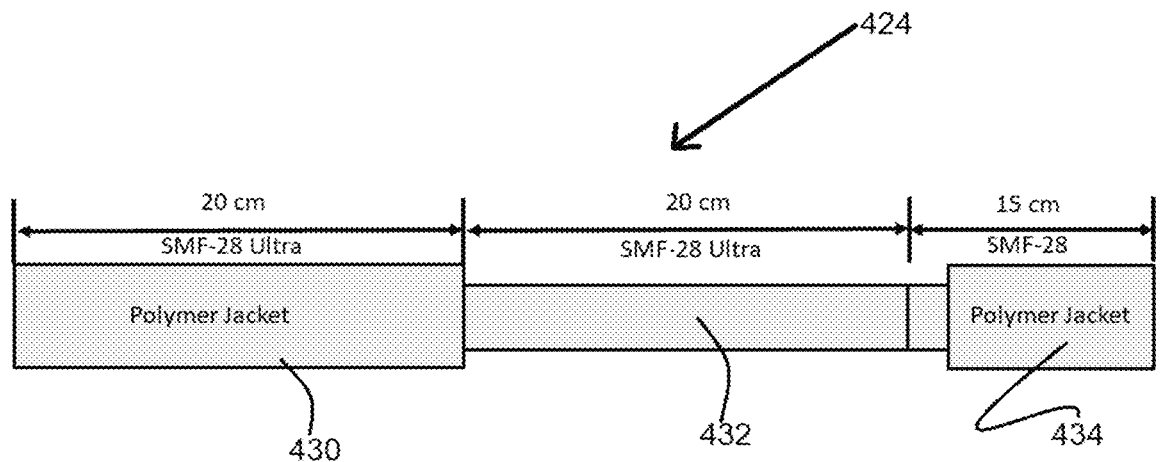
FIGS. 13A-13B depict a schematic diagram of the spliced optical fiber sensor configurations for humidity and pressure (FIG. 13A), and corrosion monitoring (FIG. 13B)
Figure 13B:
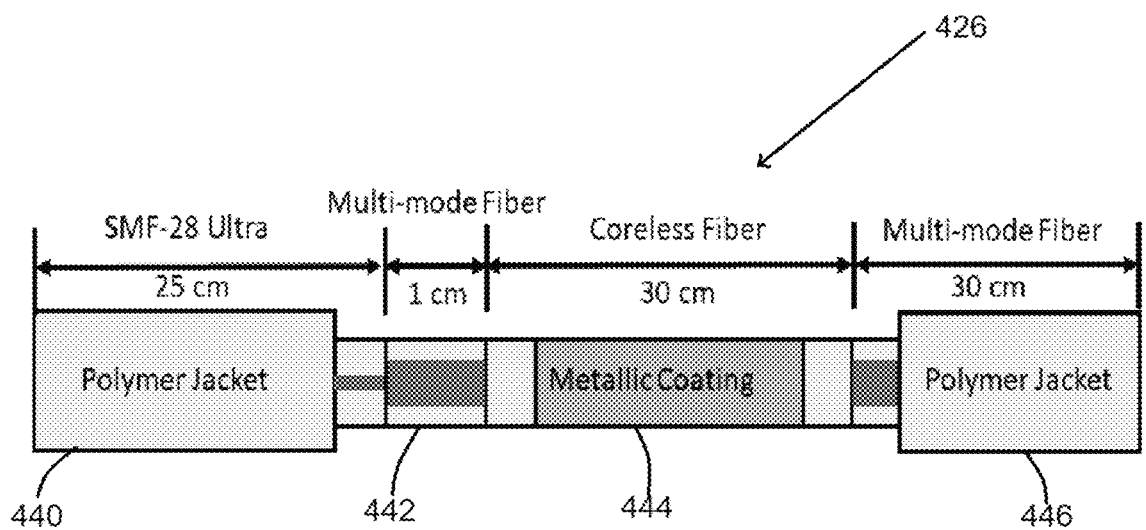

FIGS. 13A-13B depict a schematic diagram of a spliced optical fiber sensor configurations for humidity and pressure (FIG. 13A), and corrosion monitoring inside the SS tube reactor (FIG. 13B).

In the high-pressure test, a pressure sensing reference section 432 is added to the humidity sensor 424 which in this embodiment consists of 20 cm of SMF-28 Ultra fiber 430, 20 cm of unjacketed SMF-28 Ultra fiber with polymer jacket removed 432, and 15 cm of SMF-28 fiber 434, as shown in FIG. 13A. Without the polymer jacket, the unjacketed section 432 does not exhibit water sensitivity, but is sensitive to other environmental parameters such as temperature and pressure, acting as a reference to compensate for temperature and pressure effects. Additionally, the two distinct types of single-mode fibers allow for differentiation of strain and temperature effects during OFDR measurements.

After the humidity sensor 424 is inserted into the SS tube reactor 410 and sealed properly, dry $N_2$ gas flow of 200 sccm was used to dry the polymer jacket from atmospheric humidity to 0% RH at 1 atm. A new reference strain profile was set at 0% RH and 1 atm for the following strain measurements. The pressure is then raised to 900 psi with dry $N_2$ to observe the pressure effect. Lastly, the $N_2$ gas was redirected via the water bubbler to change the humidity to 100% RH at room temperature.

FIG. 13B illustrates a corrosion monitor 426 inside the SS tube reactor. In the illustrated embodiment the corrosion monitor 426 consists of 25 cm of SMF-28 Ultra fiber 440, 1 cm of multi-mode fiber 442, 30 cm of coreless fiber with a metallic coating 444, and 30 cm of multi-mode fiber with a polymer jacket 496.

Figure 14:
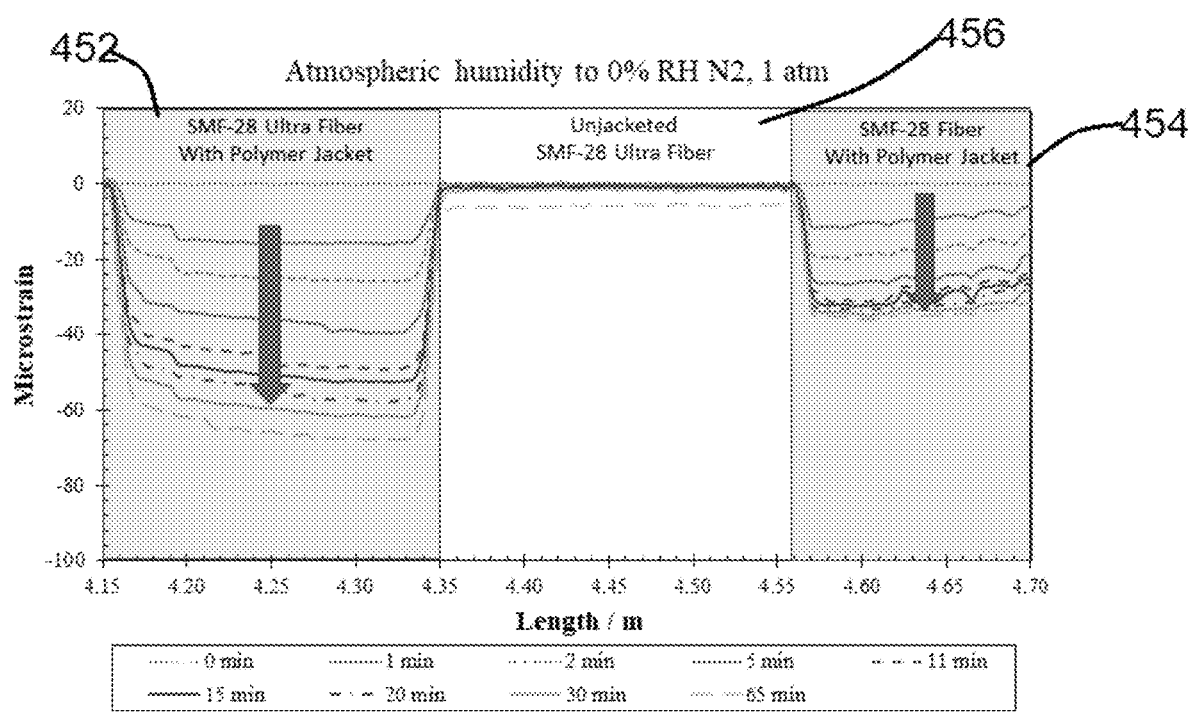
FIG. 14 graphically depicts strain changes of different SMFs during $N_2$ drying when the humidity changed from atmospheric humidity to 0% RH.

FIG. 14 depicts strain changes of different SMFs during $N_2$ drying when the humidity changed from atmospheric humidity to 0% RH. When water is desorbed during drying with dry $N_2$ from atmosphere humidity, negative strains were induced on the single-mode fibers. SMF-28 Ultra and SMF-28 have different polymer jackets and therefore have different strain responses during drying from the atmospheric humidity to 0% RH, ~66µε for SMF-28 Ultra 452, and ~34µε for SMF-28 454 as shown in FIG. 14. There were negligible strain changes detected in the unjacketed section of SMF-28 Ultra 456.

Figure 15:
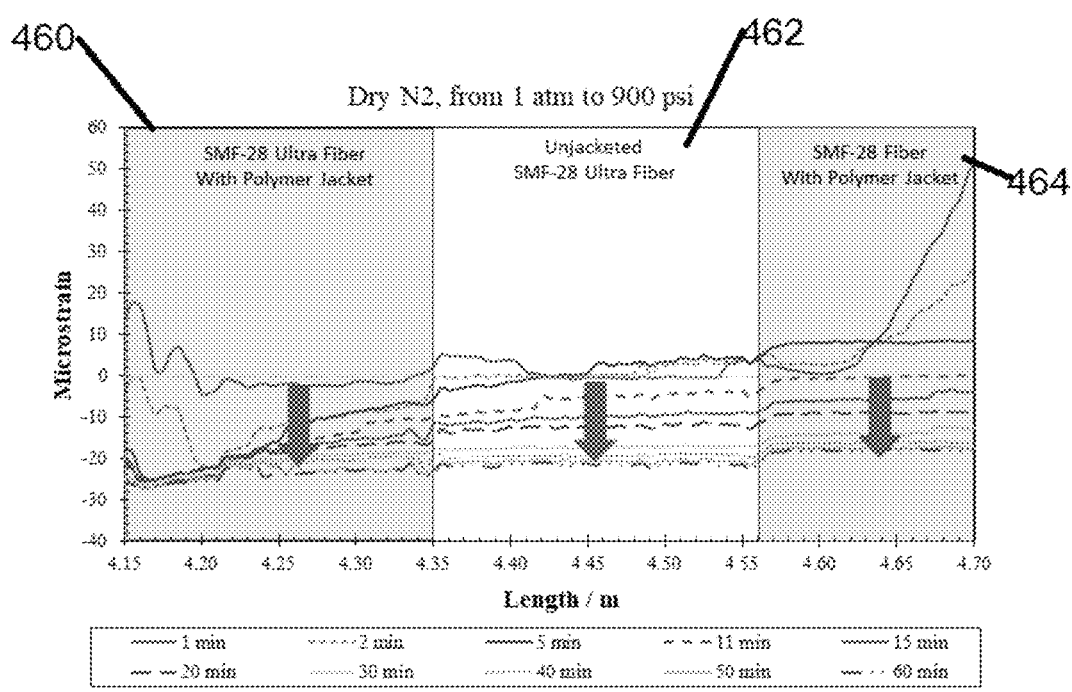
FIG. 15 graphically depicts strain changes of different SMFs when the gas reactor was pressurized from 1 atm to 900 psi with dry $N_2$.

FIG. 15 graphically depicts strain changes of different SMFs when the gas reactor is pressurized from 1 atm to 900 psi with dry $N_2$. When the gas tube reactor is pressurized, optical fiber strains became more negative as shown, indicating compressive strains along the optical fiber sensors. Under the same pressure, deformation of optical fiber sections depended on their mechanical properties. The negative strains caused by pressurization in FIG. 15 were ~23µε for SMF-28 Ultra 460, ~22µε for SMF-28 Ultra unjacketed section 462, and ~18µε for SMF-28 fiber 464. This demonstrates the distributed optical fiber sensors are capable of pressure monitoring.

Figure 16:
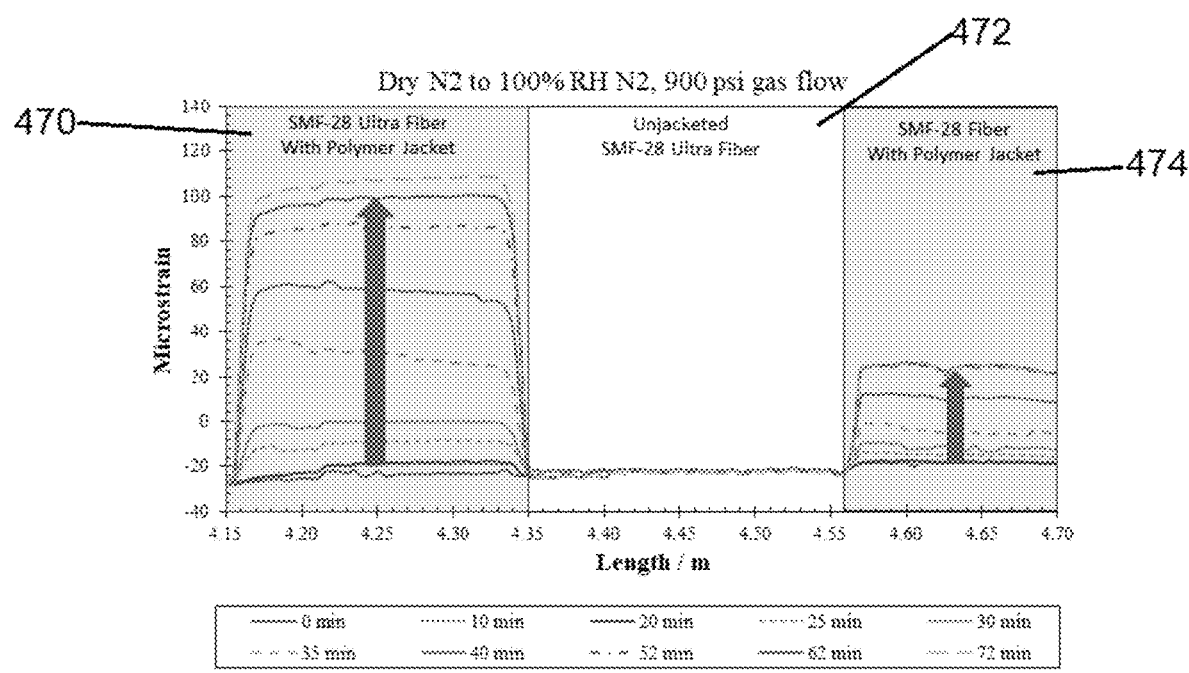
FIG. 16 graphically depicts strain changes of different SMFs at 900 psi $N_2$ when the humidity changed from 0% RH to 100% RH.

FIG. 16 graphically depicts strain changes of different SMFs at 900 psi $N_2$ when the humidity changed from 0% RH to 100% RH. When humidity (100% RH $N_2$) is introduced to the pressurized gas reactor (900 psi), the humidity is successfully measured using the polymer jacketed optical fiber sensors where the unjacketed fiber section shows minimal response. As shown in FIG. 16, from 0% to 100% RH, the strain increase of the SMF-28 Ultra Section 470 is ~130µε while the unjacketed SMF-28 Ultra fiber 472 showed <1µε changes. SMF-28 fiber section 474 shows a strain increase of ~43µε. As the unjacketed SMF-28 Ultra section 472 shows minimal response to humidity changes while exhibiting comparable sensing responses to pressure changes compared to jacketed SMF-28 Ultra and SMF-28 fiber sections, it can be used as a reference to compensate for interferences from temperature, pressure, and other environmental factors for humidity sensing.

Figure 17:
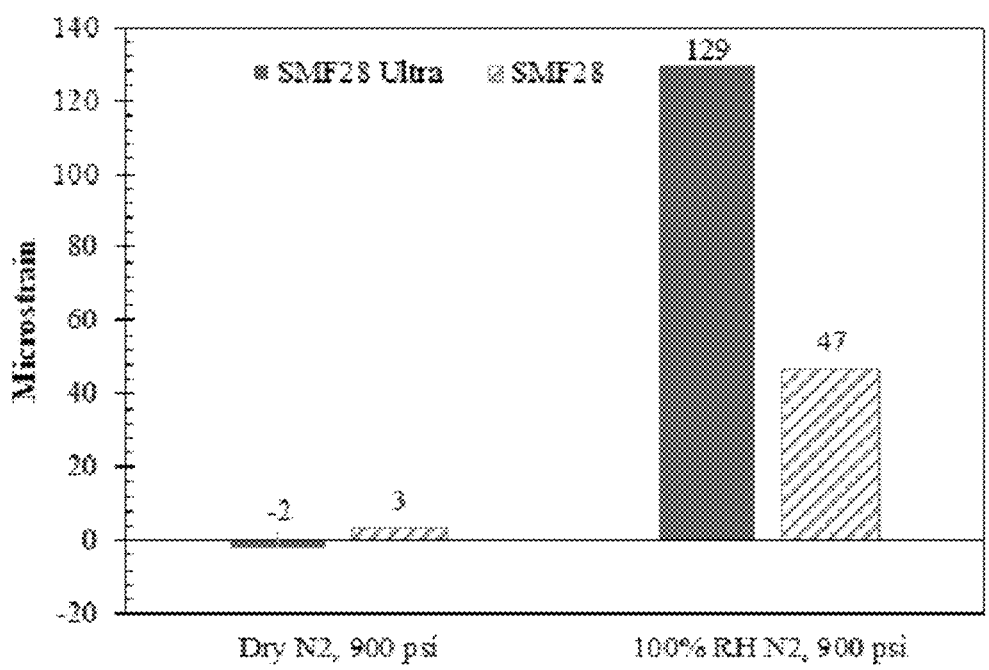
FIG. 17 graphically depicts relative strain changes with the reference of an unjacketed optical fiber sensor in response to changes in humidity levels and pressures.

FIG. 17 graphically depicts relative strain changes with reference to an unjacketed optical fiber sensor in response to changes in humidity levels and pressures. The resulting strain changes represent the responses solely due to the polymer jacket's sensitivity to humidity.

Using an Fe thin film (~30 cm long, ~35 nm thick) as the corrosion proxy coated on a coreless fiber section, corrosion monitoring of Fe thin film in wet $CO_2$ gas phase under 850 psi is shown in FIGS. 18A-18B, which plots the backscattered light intensity along the coated coreless fiber section. When dry $N_2$ (1 atm) was flowing at 200 sccm, the spatial profile of backscattered light intensity did not show noticeable responses in FIG. 18A, indicating no corrosion occurred in dry $N_2$. When wet $CO_2$ gas (100% RH $CO_2$) is flowing while pressurizing the reactor to 850 psi, the backscattered light intensity increases in several locations along the Fe thin film within the first hour (FIG. 18B), indicating localized corrosion. Localized corrosion is caused by dissolved $CO_2$ in the condensed water droplets attached to the optical fiber sensor. This type of localized corrosion is representative of internal corrosion in the natural gas pipeline. Through comparison with the ambient pressure tests in FIG. 10, the high-pressure wet $CO_2$ led to quicker corrosion than 1 atm wet $CO_2$ gas, based on the optical fiber corrosion sensor measurements.

Figure 19:
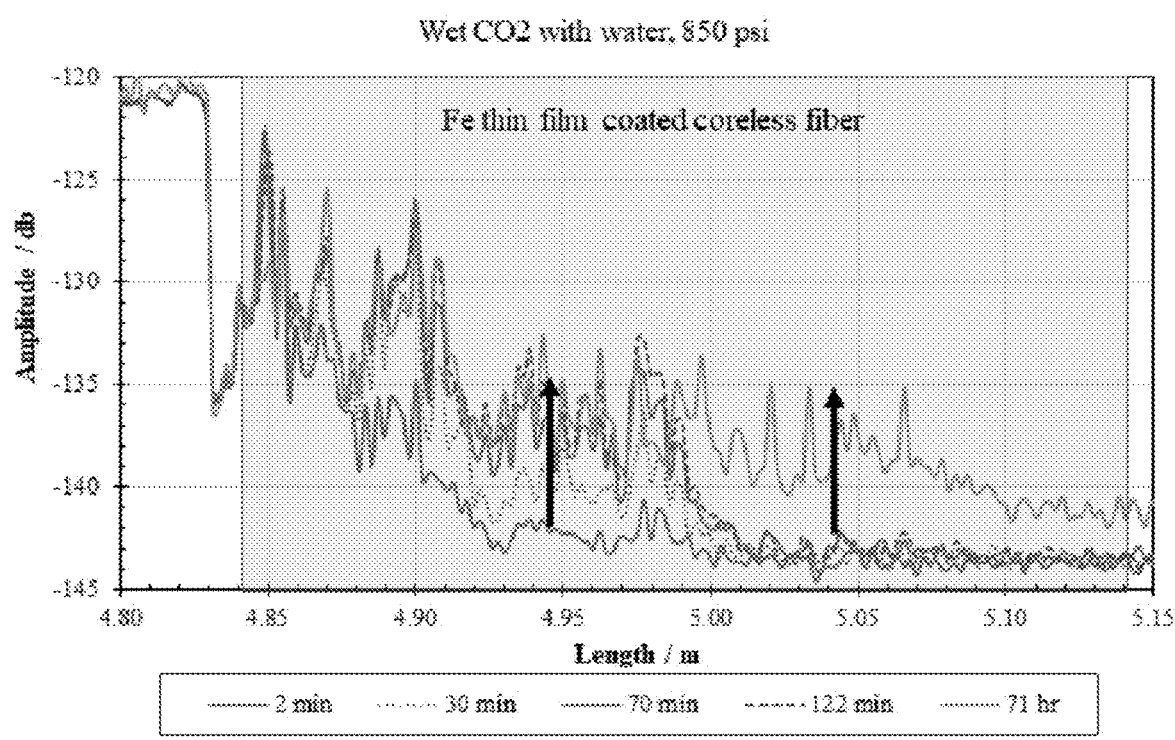
FIG. 19 graphically depicts a backscattered light intensity amplitude along the Fe thin film-coated coreless fiber section in wet CO2 gas at 850 psi with a small amount of DI water introduced.

FIG. 19 graphically depicts backscattered light intensity amplitude along the Fe thin film-coated coreless fiber section in wet $CO_2$ gas at 850 psi with a small amount of DI water introduced. As provided a small amount of DI water was introduced into the pressurized reactor in addition to wet $CO_2$ gas (850 psi) to simulate corrosion monitoring in the aqueous phase. Light intensity increases due to Fe thin film corrosion in $CO_2$ saturated aqueous phase.

Figure 20:
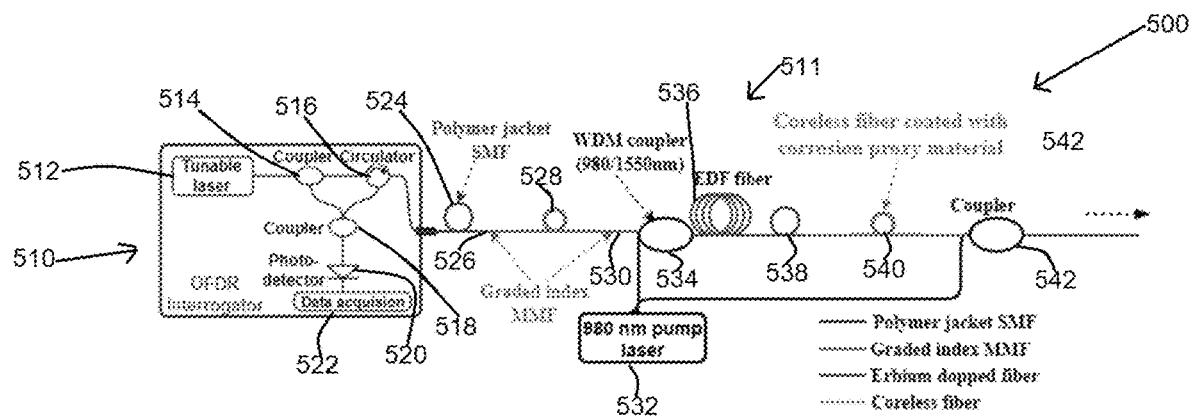
FIG. 20 depicts a schematic representation of an OFDR interrogator enhanced with amplification for a multiparameter OFS sensor.

FIG. 20 depicts a system, designated 500, for enhancing the sensing distance by inline erbium-doped fiber amplification with OFDR interrogator 510 for multiparameter OFS sensor communicating with an erbium-doped fiber amplifier (EDFA) 511. In the illustrated embodiment, the OFDR interrogator 510 includes a tunable laser 512 communicating with a coupler 514 and circulator 516. Coupler 514 and circulator 516 are shown communicating with coupler 518, photodetector 520, and data acquisition device 522.

In the illustrated embodiment, EDFA 511 includes a short length of erbium-doped fiber (EDF) 536 which connects to a pump laser 532 (at 980 nm wavelength for example). As illustrated, the polymer jacketed SMF 524 is one humidity/water sensing element and is optically connected to one corrosion sensing element (corrosion proxy material coated coreless fiber 528) with the graded index multi-mode fiber (MMF) 526 and 530 at the two ends. The graded index MMF fiber is used to reduce the coupling loss between SMF 524 and coreless fiber 528. Another sensing unit is repeated down the single optical fiber, comprising of a SMF 538 as the humidity/water sensing element and a corrosion proxy material coated coreless fiber 540 as the corrosion sensing element with graded index MMF at the two ends. The EDFA 511 is used to enhance the light intensity along the fiber, compensating the light attenuation mostly due to the evanescent field-based sensing, and it can be placed between two sensing units, as illustrated in FIG. 20. The wavelength division multiplexing (WDM) coupler 534 is shown communicating with the previous sensing unit, the pump laser 532, and the EDF fiber 536. EDF fiber 536 then communicates with the next sensing unit comprising SMF 538 and the coreless fiber coated with corrosion proxy material 540. The WDM coupler 542, which communicates with the pump laser 532, shows the repeated pattern of EDFA along the fiber. It's worth noting that the EDFA is only intended for locations where the accumulated light attenuation along the fiber has led to a weak sensing signal and doesn't have to be used for every sensing unit along the fiber.

When the EDF 536 is pumped by a 980 nm laser diode 532, stimulated emissions arise. This stimulation excitation process creates a population inversion between the ground level and the excited state of erbium ions, and amplification for 1550 nm wavelength takes place. This action amplifies a weak optical signal to a higher power, effecting a boost in the signal strength. The coreless fiber coated with corrosion proxy material 540 is connected to the EDF fiber 536 which can enhance the backscattered light amplitude originated from coreless fiber and increase the signal-to-noise ratio. The EDFA 511 provides in-line amplification of signal without requiring electronics, and the signal does not need to be converted to an electrical signal before amplification. By controlling the pump current of the 980 nm laser 532, the signal amplification (also called gain) can be altered. By utilizing inline EDFA amplification technique 511 the sensing range can be improved significantly without sacrificing the spatial resolution As an emerging sensing technology, a network of optical fiber sensors can realize a distributed sensor system for early corrosion onset and water detection over a long distance. The optical fiber sensors can be deployed inside the pipeline to monitor internal corrosion, which can be installed at the top and/or bottom of the pipe or any position of interest along the whole pipe.

It should be appreciated that passive wireless surface acoustic wave (SAW) sensors have great promise in multiparameter detection upon proper design and functionalization. Embodiments include reflective delay line SAW sensor arrays consisting of at least three sensor elements that can be powered simultaneously with single radio frequency (RF) signal, either wirelessly or with wire connection, for detection and monitoring of humidity and corrosion onset. The sensor devices may utilize a variant of SAW modes including Rayleigh, Pseudo SAW, Shear Horizontal, and Love modes, and may be fabricated on a piezoelectric substrate such as LiNbO3, LiTaO3, and Quartz by depositing comb-like metallic interdigital electrodes (IDTs). Materials for the IDTs are selected based on a specific proposed application and may consist aluminum, gold, or platinum metals and their alloys. These devices are functionalized with humidity and corrosion sensitive materials to enable them for humidity and corrosion detection and monitoring. Candidate humidity sensitive materials include hygroscopic polymers, metal organic frameworks, zeolites, and graphene oxide. Similarly, candidate corrosion proxy materials include Fe, Ni, X65 carbon steel, carbon steel, stainless steels, alloys, other metallic films amongst others. In some cases, such as the devices that utilize SH-SAW, Love Waves, or Pseudo SAW, using a thin layer of a metal, polymer, or silica on top of the piezoelectric substrate before coating sensitive layer may be helpful to better excite the surface waves and guide them.

Figure 21:
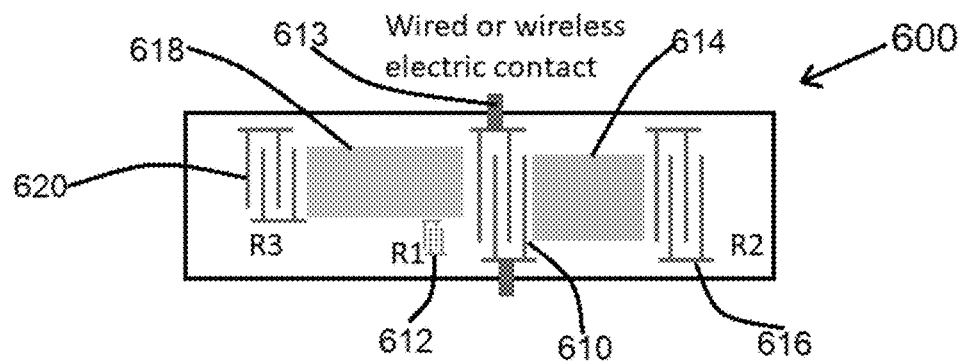
FIG. 21 depicts a schematic of a proposed SAW sensor array for simultaneous detection and monitoring of humidity and corrosion onset.

FIG. 21 depicts a schematic of a SAW sensor array designated 600 for simultaneous detection and monitoring of humidity and corrosion onset. In this embodiment array 600 includes an RF emitting IDT 610 and three reflectors 612, 616, and 620 respectively, each associated with a sensor element. FIG. 21 depicts IDT 610 having a wired and/or a wireless electric contact 613. The first reflector R1 612 serves as the identification for the sensor device and reference for temperature compensation, the region 614 between the second reflector R2 616 and the emitting IDT 610 is functionalized with humidity sensitive layer such as hygroscopic polymer, and the region 618 between the third reflector R3 620 and the emitting IDT 610 is functionalized with a corrosion proxy material, enabling them for humidity and corrosion detection, respectively. Embodiments of this array enable recording the time delay caused by the water vapor or corrosion onset in the form of phase change and correlate to the respective parameters for quantitative analysis.

It should be appreciated that any SAW modes may be used for detection and monitoring humidity and corrosion in gaseous phase. For corrosion or pH monitoring in liquid phase, however, an SH-SAW, Pseudo SAW, or Love waves are preferred. In an exemplary embodiment, a Finite Element Modeling (FEM) prediction of a Pseudo SAW sensor for humidity and corrosion detection and monitoring is contemplated. FIGS. 22A-22B depict the surface displacements of a SAW device on 41° Y-X $LiNbO_3$ with no guiding layer (FIG. 22A) and 100 nm thick $SiO_2$ guiding layer (FIG. 22B) at its resonance. The waves excited on this substrate were Pseudo SAWs and the devices were designed to resonate at around 600 MHz. As shown in the figures, the wave energy in the structure with guided layer are better concentrated to the surface making the surface more sensitive to external parameters.

Figure 23:
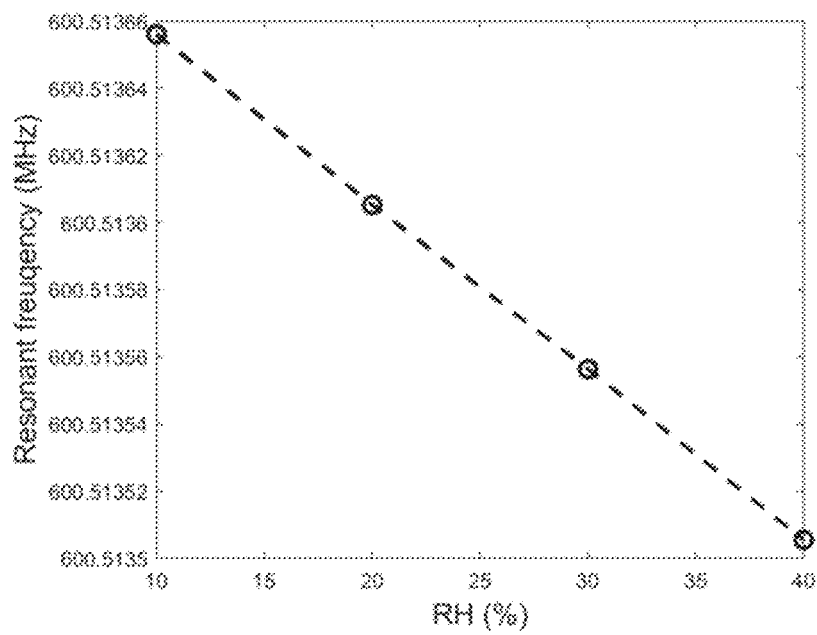
FIG. 23 graphically depicts a simulated response of a 100 nm thick Acrylic plastic-coated 41 Y-X LiNbO3 SAW resonator with a hypothetical partition coefficient of 17 to water vapor.

FIG. 23 depicts simulated response of a 100 nm thick acrylic plastic-coated 41° Y-X $LiNbO_3$ SAW resonator with a hypothetical partition coefficient of 17 to water vapor. Increasing the relative humidity from 10% to 40% decreases the resonant frequency by 160 Hz. The mass of the polymer layer increased with an increase in the humidity level that caused a decrease in the resonant frequency. It should be appreciated that exposure of humidity to a polymeric film could change the mass density, mechanical loading, and permittivity.

Figure 24:
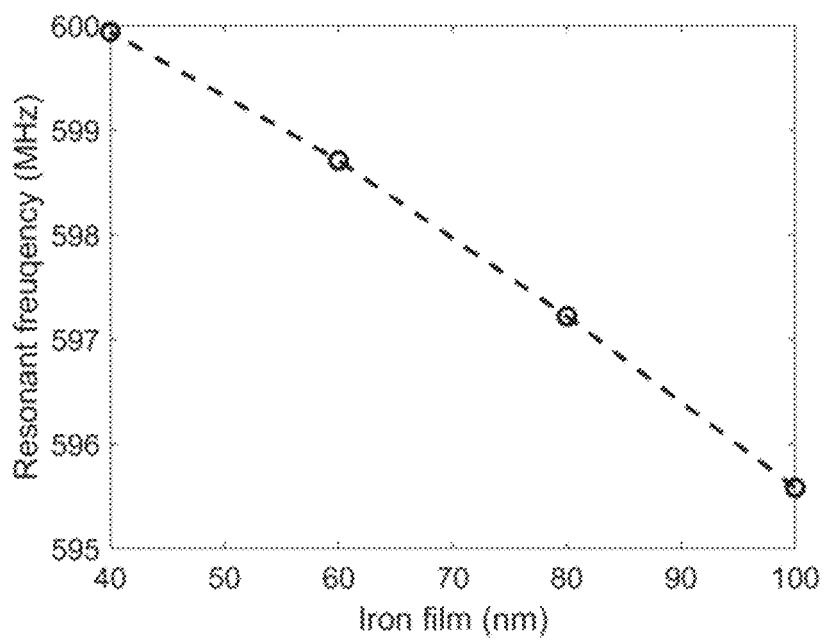
FIG. 24 graphically depicts a resonant frequency of a Fe coated/41° Y-X LiNbO3 structure as a function of Fe film thickness.

FIG. 24 graphically depicts the resonant frequency of a Fe coated/41° Y-X $LiNbO_3$ structure as a function of Fe film thickness. As shown, the resonant frequency increases by almost 5 MHz for a reduction of Fe film thickness by 50 nm.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are within the scope of the spirited embodiments as recited in the appended claims. Additionally, the recited order of the elements or sequences, or the use of numbers, letters, or other designations, therefore, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about," whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:
1. A sensor configuration system comprising:
at least one device configured to sense a first parameter;
at least one device configured to sense a second parameter interfacing with the at least one device configured to sense the first parameter; and
at least one interrogator device interfacing with both the at least one device configured to sense the first parameter and the at least one device configured to sense the second parameter where the at least one interrogator device spatially interrogates both the at least one device configured to sense the first parameter and the at least one device configured to sense the second parameter;

wherein the at least one device sensing the first parameter; the at least one device sensing the second parameter and the at least one interrogator device are optically coupled using a single optical fiber providing at least location information.

2. The system of claim 1 wherein the at least one device sensing the first parameter and the at least one device sensing the second parameter comprises a multi-element surface acoustic wave (SAW) sensor array having wireless capability.

3. The system of claim 1 wherein the at least one interrogator device comprises a distributed optical fiber interrogator with amplification to enhance interrogation distance, which measures backscattered light power intensity changes and strain changes simultaneously and provides location information along the optical fiber.

4. A sensor configuration system comprising:
a plurality of devices sensing a first parameter;
a plurality of devices sensing a second parameter optically communicating with the plurality of devices sensing a first parameter using a single optical fiber; and
at least one interrogator device optically communicating with both the plurality of devices sensing the first parameter and the plurality of devices sensing the second parameter via the optical fiber and spatially resolving measurements along the optical fiber providing location information.

5. The system of claim 4 wherein the plurality of devices sensing a first parameter comprises an optical fiber coated with a corrosion proxy sensing material, wherein the corrosion proxy sensing material is configured to produce light power intensity changes when corroded.

6. The system of claim 5 wherein the corrosion proxy material is a metal film selected from the group comprising Fe, Ni, carbon steel, stainless steels, alloys, or other metallic films.

7. The system of claim 6 wherein the optical fiber further includes a cladding over at least a portion thereof.

8. The system of claim 4 wherein the plurality of devices sensing a second parameter comprises humidity/water sensing elements.

9. The system of claim 8 wherein the plurality of humidity/water sensing elements comprise a single-mode optical fiber having a polymer or hydrogel jacket leading to strain changes at different humidity levels.

10. The system of claim 9 wherein the polymer or hydrogel jacket is selected from a material group that expands or shrinks when exposed to different humidity or water content comprising acrylate, polyimide, and porous hydrogels.

11. The system of claim 10 wherein at least a portion of the single-mode optical fiber includes a cladding.

12. The system of claim 4 wherein the at least one interrogator device comprises a distributed optical fiber interrogator with amplification to enhance interrogation distance, which measures backscattered light power intensity changes and strain changes simultaneously and provides location information along the optical fiber.

13. A sensor configuration system comprising:
a plurality of humidity/water sensing elements;
a plurality of corrosion sensing elements communicating with the plurality of humidity sensing elements using a single optical fiber, wherein the plurality of humidity/water sensing elements and the plurality of corrosion sensing elements are arranged in an alternating pattern along the single optical fiber; and
a distributed optical fiber interrogator communicating with both the plurality of humidity/water sensing elements and the plurality of corrosion sensing elements via the single optical fiber, with amplification to enhance interrogation distance, which measures backscattered light power intensity changes and strain changes simultaneously and provides location information along the optical fiber.

* * * * *